(12) United States Patent
Lovens et al.

(10) Patent No.: US 7,525,073 B2
(45) Date of Patent: Apr. 28, 2009

(54) TRANSVERSE FLUX ELECTRIC INDUCTORS

(75) Inventors: Jean Lovens, Embourg (BE); Mike Maochang Cao, Westampton, NJ (US)

(73) Assignee: Inductotherm Corp., Rancocas, NJ (US)

( * ) Notice: Subject to any disclaimer, the term of this patent is extended or adjusted under 35 U.S.C. 154(b) by 0 days.

(21) Appl. No.: 11/677,712

(22) Filed: Feb. 22, 2007

(65) Prior Publication Data

US 2007/0194010 A1 Aug. 23, 2007

Related U.S. Application Data

(60) Provisional application No. 60/775,541, filed on Feb. 22, 2006.

(51) Int. Cl.
*H05B 6/02* (2006.01)
(52) U.S. Cl. ........................ 219/645; 219/646
(58) Field of Classification Search ......... 219/635–646, 219/670–677; 266/129; 148/567–574
See application file for complete search history.

(56) References Cited

U.S. PATENT DOCUMENTS

| | | | |
|---|---|---|---|
| 2,448,012 A | 8/1948 | Baker | |
| 3,444,346 A * | 5/1969 | Cable et al. | 219/645 |
| 4,678,883 A * | 7/1987 | Saitoh et al. | 219/645 |
| 4,751,360 A | 6/1988 | Ross | |
| 5,693,875 A | 12/1997 | Cremer | |
| 5,739,506 A | 4/1998 | Hanton et al. | |
| 6,229,126 B1 | 5/2001 | Ulrich et al. | |
| 2002/0121512 A1* | 9/2002 | Thorpe et al. | 219/645 |

* cited by examiner

*Primary Examiner*—Quang T Van
(74) *Attorney, Agent, or Firm*—Philip O. Post

(57) ABSTRACT

An apparatus and process are provided for inductively heating a workpiece to a desired cross sectional temperature. At least one pair of coils form a transverse flux inductor. The workpiece is located between the pair of opposing coils, which are oriented across the cross section of the workpiece. Each coil comprises a plurality of coil sections. The distance between one or more opposing coil sections is adapted to achieve the desired cross sectional induction heating temperature profile in the workpiece. Alternatively the distance between all opposing coil sections are equidistant from each other, and one or more flux concentrators, moveable at least in a direction perpendicular to the surface of the workpiece, can be used to achieve the desired cross sectional induction heating temperature profile in the workpiece.

1 Claim, 14 Drawing Sheets

TRANSVERSE FLUX ELECTRIC INDUCTORS

CROSS REFERENCE TO RELATED APPLICATIONS

This application claims the benefit of U.S. Provisional Application No. 60/775,541, filed Feb. 22, 2006, hereby incorporated by reference in its entirety.

FIELD OF THE INVENTION

The present invention relates to transverse flux electric inductors, and in particular, to such inductors when used to heat a sheet or strip of electrically conductive material.

BACKGROUND OF THE INVENTION

A typical conventional transverse flux inductor comprises a pair of induction coils. A material to be inductively heated is placed between the pair of coils. For example, in FIG. 1, the coil pair comprises coil 101 and coil 103, respectively located above and below the material, which may be, for example, metal strip 90, which moves continuously through the pair of coils in the direction illustrated by the arrow. For orientation, a three dimension orthogonal space is defined by the X, Y and Z axes shown in FIG. 1. Accordingly the strip moves in the Z direction. The gap, $g_c$, or opening, between the coil pair is exaggerated in the figure for clarity, but is fixed in length across the cross section of the strip. Terminals 101a and 101b of coil 101, and terminals 103a and 103b of coil 103, are connected to one or more suitable ac power sources (not shown in the figures) with instantaneous current polarities as indicated in the figure. Current flow through the coils creates a common magnetic flux, as illustrated by typical flux line 105 (illustrated by dashed line), that passes perpendicularly through the strip to induce eddy currents in the plane of the strip. Magnetic flux concentrators 117 (partially shown around coil 101 in the figure), for example, laminations or other high permeability, low reluctance materials, may be used to direct the magnetic field towards the strip. Selection of the ac current frequency (f, in Hertz) for efficient induced heating is given by the equation:

$$f = 2 \times 10^6 \frac{\rho g_c}{\tau^2 d_s}$$

where $\rho$ is the electrical resistivity (in $\Omega \cdot m$) of the workpiece; $g_c$ is the length of the gap (opening) between the coils in meters; $\tau$ is the pole pitch (step) of the coils in meters; and $d_s$ is the thickness of the strip (in meters).

The classical problem to be solved when heating strips by electric induction with a transverse flux inductor is to achieve a uniform cross sectional (along the X-axis), induced heating temperature across the strip. FIG. 2(a) illustrates a typical cross sectional strip heating profile obtained with the arrangement in FIG. 1 when the pole pitch of the coils is relatively small and, from the above equation, the frequency is correspondingly low. The X-axis in FIG. 2(a) represents the normalized cross sectional coordinate of the strip with the center of the strip being coordinate 0.0, and the opposing edges of the strip being coordinates +1.0 and −1.0. The Y-axis represents the normalized temperature achieved from induction heating of the strip with normalized temperature 1.0 representing the generally uniform heated temperature across middle region 111 of the strip. Nearer to the edges of the strip, in regions 113 (referred to as the shoulder regions), the cross sectional induced temperatures of the strip decrease from the normalized temperature value of 1.0, and then increase in edge regions 115 of the strip to above the normalized temperature value of 1.0. When the pole pitch of the coils is relatively large, from the above equation, the frequency is correspondingly high. In these cases under heating in the identified shoulder regions disappears while overheating of the edges remains as illustrated in FIG. 2(b). Typically a constant induced heating temperature across the entire cross section of the strip is desired so that, for example, under heated shoulder regions and overheated edge regions of the strip do not have to be scrapped when the heated strip undergoes a coating process.

Many solutions have been proposed to correct the edge heating problem, such as separate edge heaters, and arrangements of coils and/or laminations to alter the configuration of the resulting flux field, which in turn, attempts to alter the edge heating profile of the strip. While there may be some benefit to these approaches, there still exists the need for an arrangement of a transverse flux induction inductor that can achieve significant uniformity in cross sectional heating of the strip, particularly when the position of the strip varies in the coil or when the width of the strip varies.

BRIEF DESCRIPTION OF THE INVENTION

In one aspect, the present invention is an apparatus for, and method of, electric induction heating of an electrically conductive workpiece. An inductor comprises at least one pair of coils formed from a first and second coil. The electrically conductive workpiece is placed between the pair of coils. Each of the first and second coils comprises a plurality of coil sections. At least one ac power supply is suitably connected to the first and second coils of the inductor to supply ac power to the inductor. The gap between opposing coil sections is adapted to provide a desired induced cross sectional heating temperature profile for the workpiece.

In another aspect, the present invention is an apparatus for, and method of, electric induction heating of an electrically conductive workpiece. An inductor comprises at least one pair of coils formed from a first and second coil. The electrically conductive workpiece is placed between the pair of coils. Each of the first and second coils comprises a plurality of coil sections. At least one ac power supply is suitably connected to the first and second coils of the inductor to supply ac power to the inductor. The gap between opposing coils sections is equidistant from each other for all coil sections and at least one flux concentrator is placed in the vicinity of at least one of the plurality of coil sections. The at least one flux concentrator is moveable at least in the direction perpendicular to the surface of the workpiece to provide a desired induced cross sectional heating temperature profile for the workpiece.

The above, and other aspects of the invention, are further set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
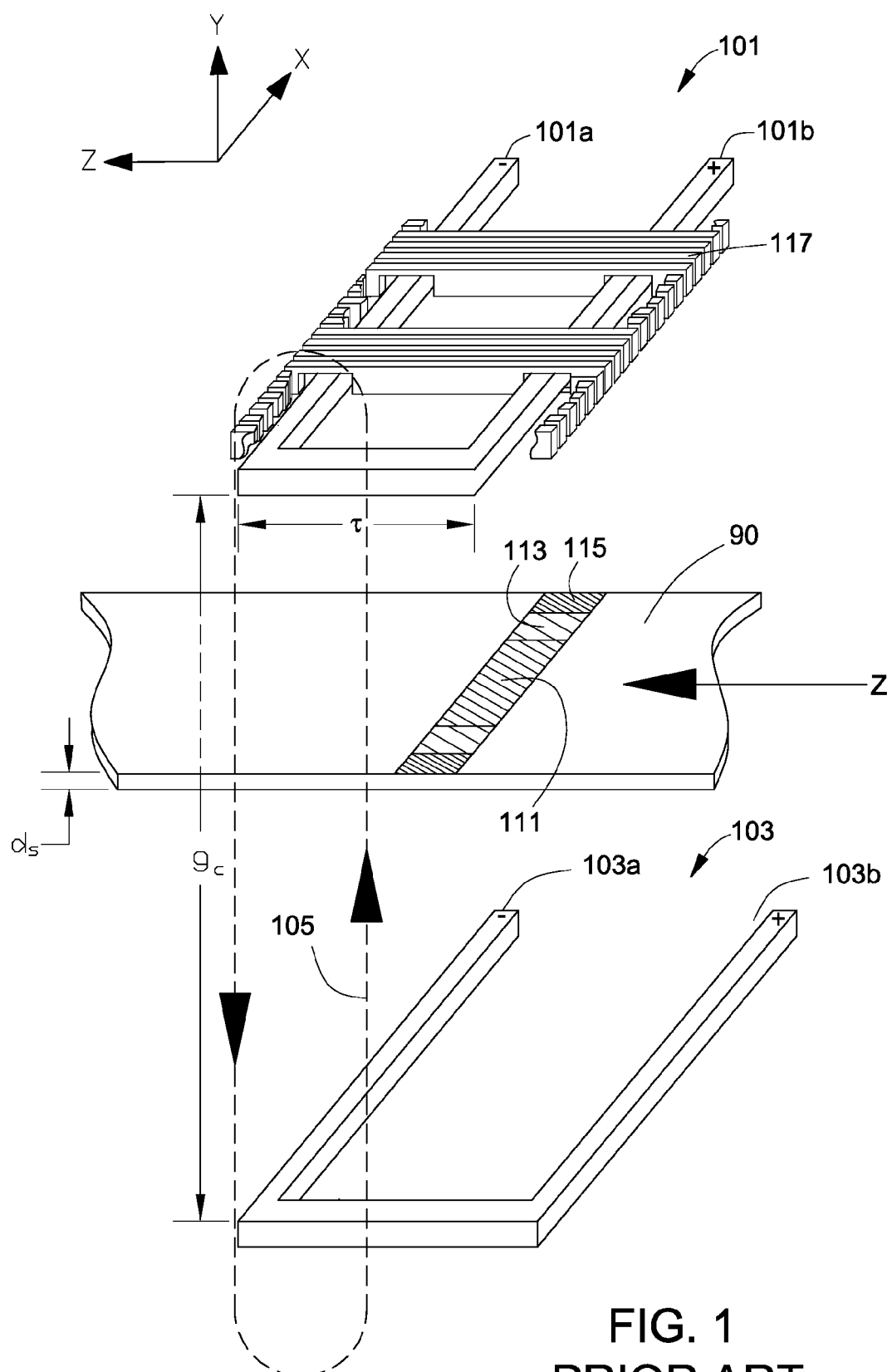
FIG. 1 illustrates a prior art transverse flux inductor arrangement.
Figure 2A:
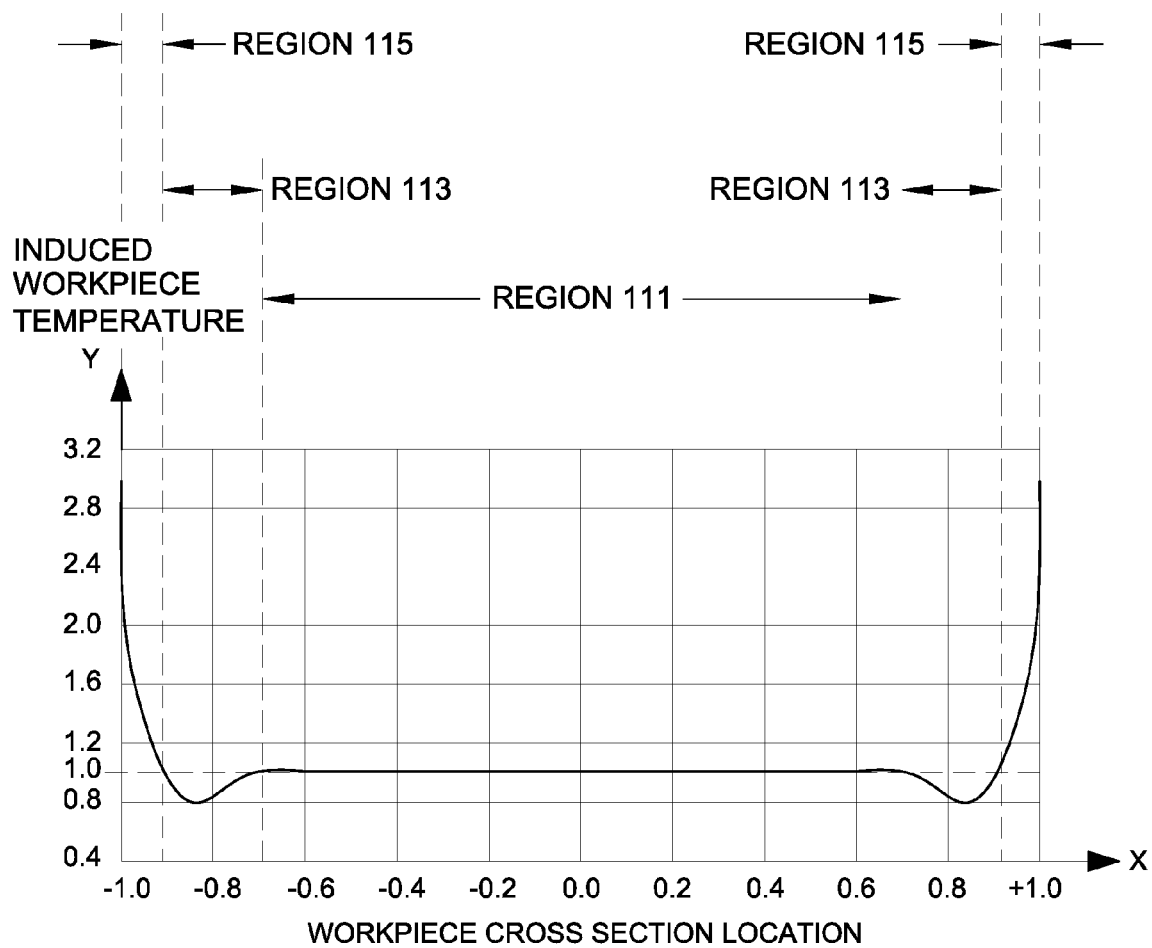
FIG. 2(a) and FIG. 2(b) graphically illustrate typical cross sectional induced heating characteristics for the transverse flux inductor arrangement shown in FIG. 1.
Figure 2B:
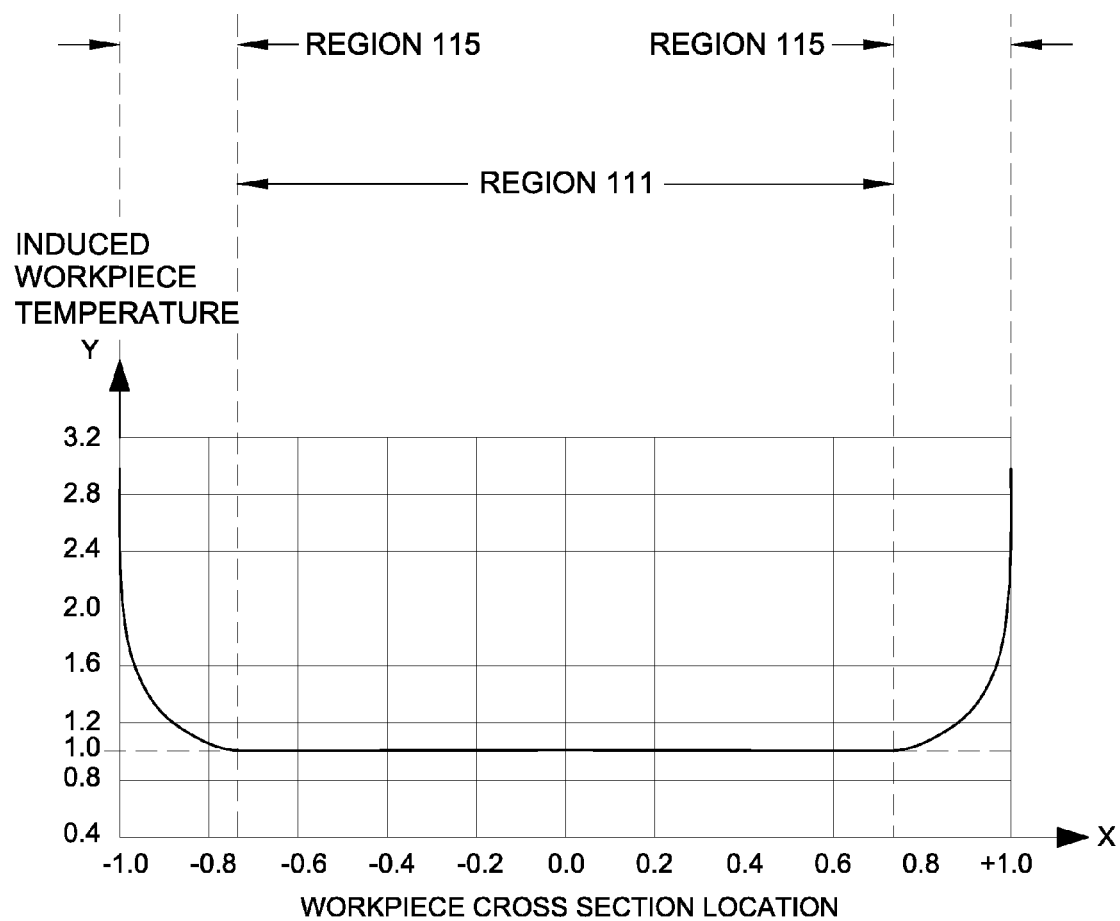
Figure 3A:
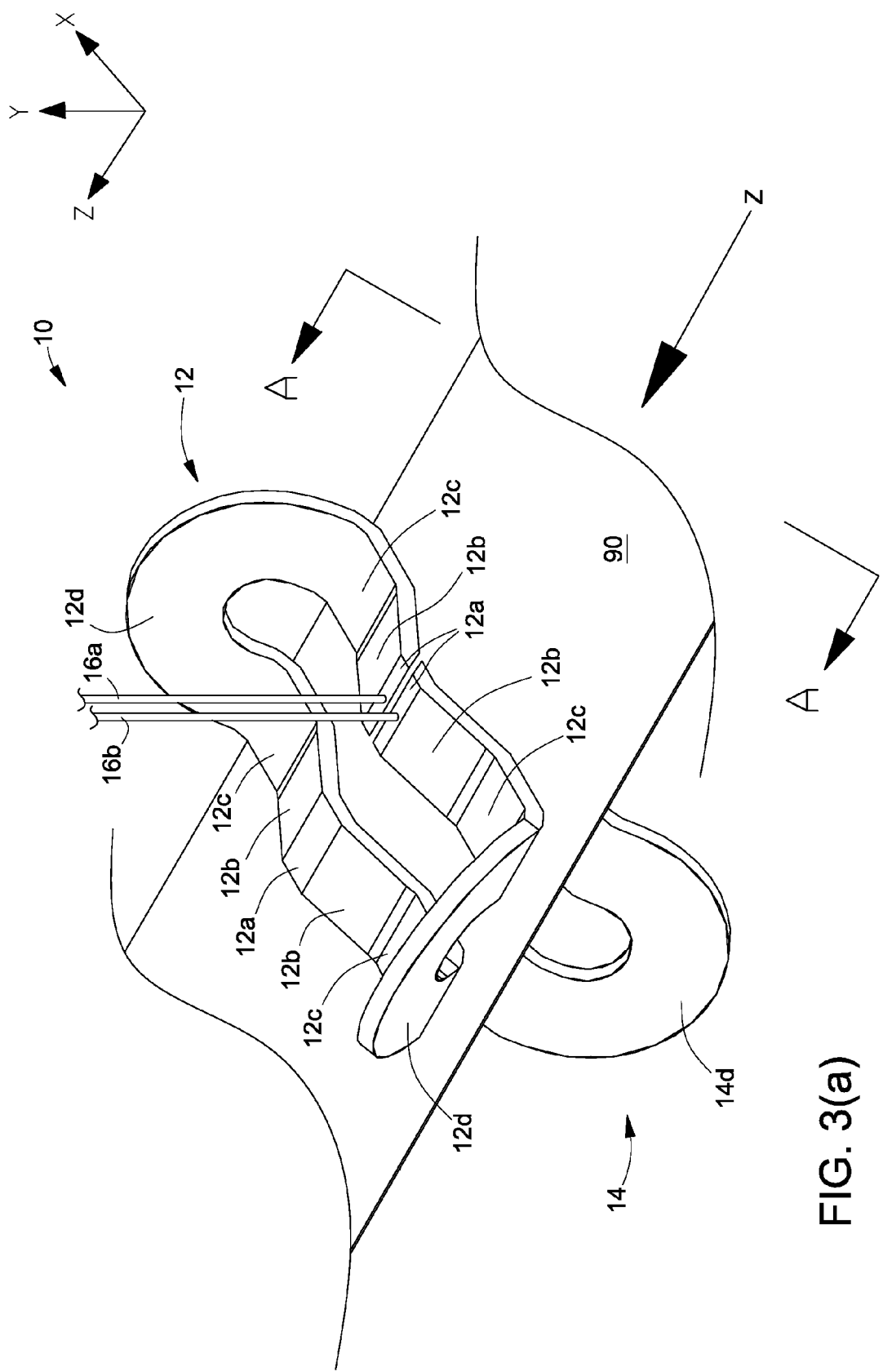
FIG. 3(a) illustrates one example of the transverse flux inductor of the present invention.
Figure 3B:
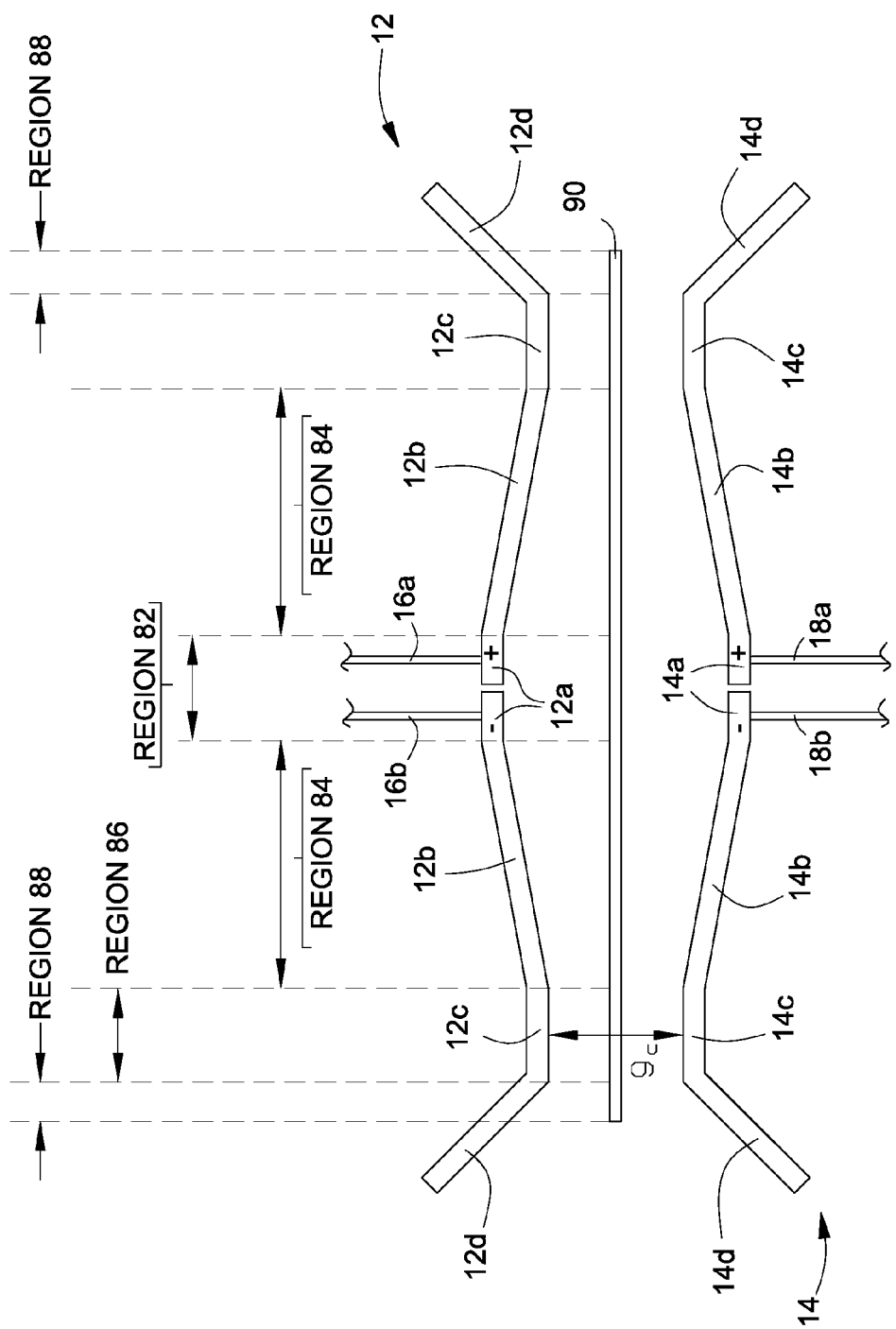
FIG. 3(b) is an elevation view of the transverse flux inductor of the present invention shown in FIG. 3(a) through line A-A.

Referring now to the drawings, wherein like numerals indicate like elements, there is shown in FIG. 3(a) and FIG. 3(b) one example of a transverse flux inductor 10 of the present invention. In this non-limiting example, transverse flux inductor 10 comprises a coil pair formed from first coil 12 and second coil 14 oriented across the cross section of workpiece 90, which is placed between the pair of coils. The workpiece may be a sheet or strip of an electrically conductive material such as a metallic strip. Each of the coils comprises a plurality of coil sections. First coil 12 comprises central sections 12a, transition sections 12b, shoulder sections 12c and edge sections 12d. As shown in FIG. 3(a) and FIG. 3(b) each central section is generally centered over the center of the cross section of workpiece. A transition section 12b is connected at one end to each end of the central sections. The other end of each transition section is connected to one end of each shoulder section 12c. An edge section 12d joins together the two shoulder sections at each edge of the workpiece. Similarly second coil 14 comprises central sections 14a, transition sections 14b, shoulder sections 14c and edge sections 14d. In this non-limiting example of the invention, the second coil is similar in construction to the first coil and is located in-line (that is, not offset or not skewed in the Z-direction) with the first coil, facing the side of the workpiece opposed to the side of the workpiece facing the first coil. First and second coils are suitably connected to one or more ac power supplies (not shown in the figures). For example coil 12 may have power supply connections 16a and 16b attached to central section 12a, and coil 14 may have power supply connections 18a and 18b attached to corresponding section 14a, with the instantaneous polarities as shown in the figures. Power supply connections may be made in any section of a coil depending upon the requirements of a particular application. To accommodate the power supply connections, each coil is sufficiently opened at the power supply connection to electrically isolate the two connections. Workpiece 90 may move through the gap between the first and second coils so that when current flows through these coils, the workpiece is heated by electric induction. In other examples of the invention, each section of a coil may be further divided into subsections. For example each transition section may comprise two or more transition subsections.

Figure 3C:
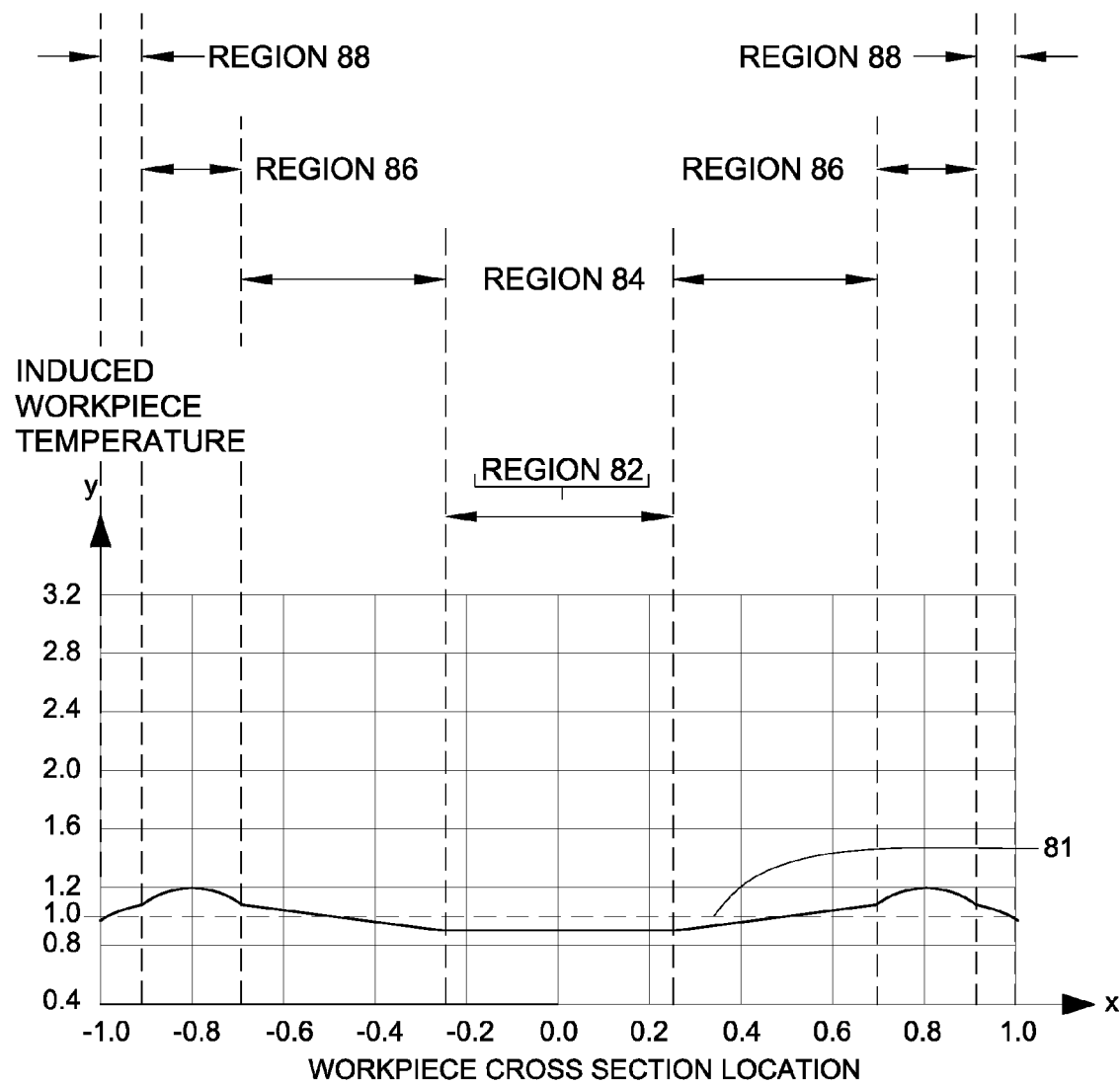
FIG. 3(c) graphically illustrates cross sectional heating characteristics for one example of the transverse flux inductor arrangement shown in FIG. 3(a) and FIG. 3(b).

In one example of the invention coils 12 and 14 are fixed in shape so that central sections 12a and 14a are located further away from facing surfaces of the workpiece than shoulder sections 12c and 14c, and transition sections 12b and 14b connect adjacent central and shoulder sections together. Edge sections 12d and 14d connect the outer ends of shoulder sections 12c and 14c together at each edge of the workpiece. In this non-limiting arrangement opposing central sections 12a and 14a are further away from each other than opposing shoulder sections 12c and 14c. More heat is electrically induced in the workpiece cross sections between opposing shoulder sections than in cross sections between opposing central sections. In the cross sections between opposing transition sections, induced heat gradiently increases in the direction towards the shoulder sections. Orientating the edge sections away from the edges of the workpiece as shown in FIG. 3(a) and FIG. 3(b), reduces the edge overheating effect described in the prior art. FIG. 3(c) illustrates a typical cross sectional strip heating profile obtained with the arrangement in FIGS. 3(a) and 3(b).

In the present invention, changing the length of gap, $g_c$, between opposing coil sections is generally done to achieve a desired induced cross sectional temperature profile for the workpiece. In some cases the desired induced cross sectional temperature profile may be uniform; however in other cases the desired profile may be non-uniform. For a particular application the length of the variable gaps between opposing coil sections may be determined, for example, by calculations, by simulations or test runs with the apparatus and a particular workpiece, or any combination of these methods. Further a computer processor may execute a computer program with feedback signal input of the actual measured induced heating temperatures of the strip to further adjust the gaps between opposing coil segments. This computer process is advantageous in an adaptive learning process wherein the process continuously makes gap adjustments based upon one or more parameters of the workpiece, for example, variations in the composition of the workpiece passing through the coils, changes in the width of the workpiece, or changes in the instantaneous position of the workpiece relative to the coils.

Figure 3D:
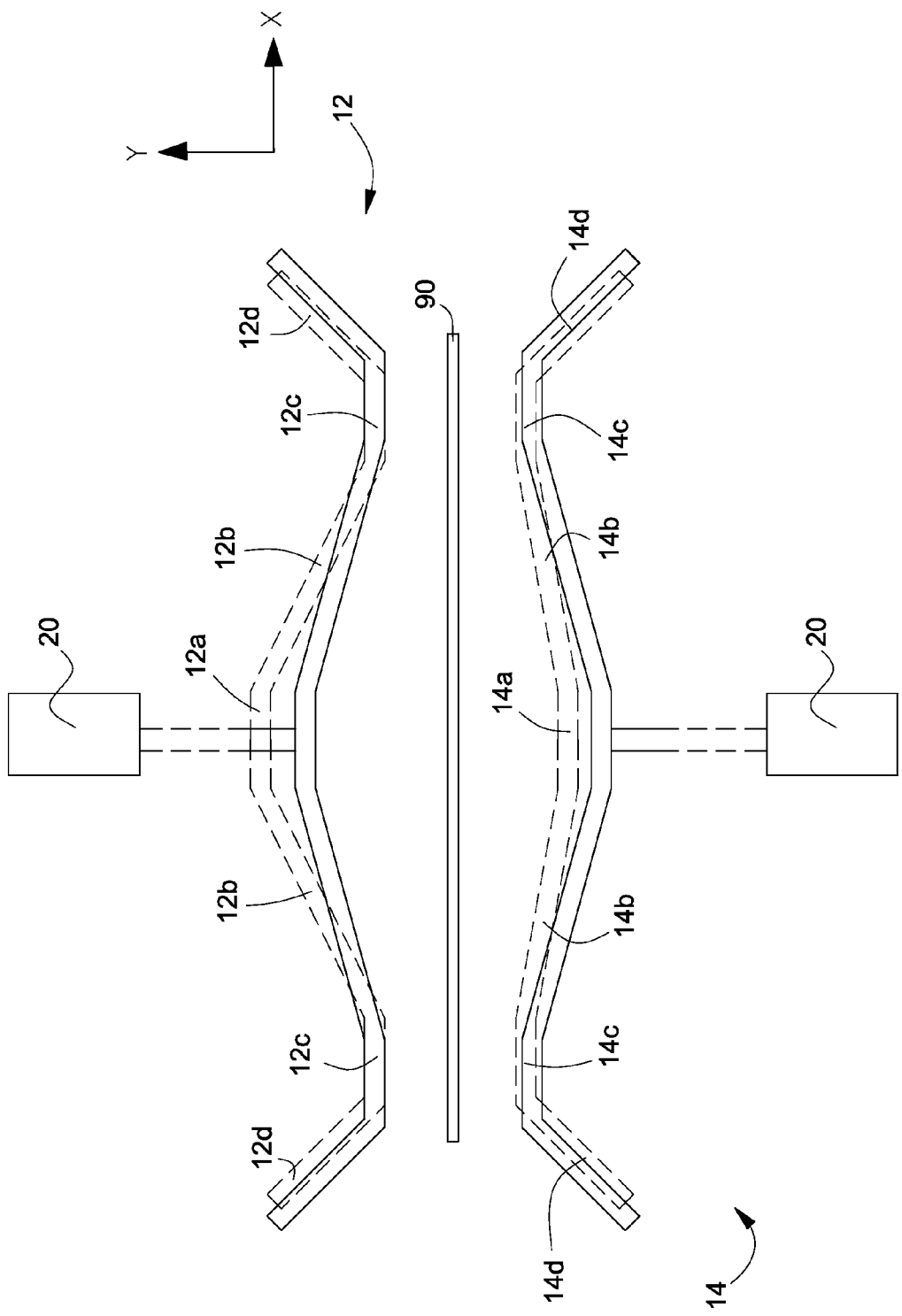
FIG. 3(d) is an elevation view of another example of the transverse flux inductor of the present invention.

In other examples of the invention, adjacently connected sections of each coil may be flexibly attached to each other so that the distances between opposing sections of coils 12 and 14 may be brought further apart or closer together, and/or coils 12 and 14 may be made shorter or longer in cross sectional width. For example in FIG. 3(d), operator 20 (for example, a human operator, a linear hydraulic actuator or any other actuator) may be attached to central sections 12a and 14a to move central sections 12a and 14a towards workpiece 90. Constraining movement of shoulder sections 12c and 14c to the X-direction will result in increasing the induced heat in regions around the central section and increasing the overall cross sectional width of coils 12 and 14 since the shoulder sections are constrained to slide towards the edges of the workpiece. This is illustrated in FIG. 3(d) by showing coils 12 and 14 in dashed lines with central sections farther away form the workpiece, and in solid lines with central sections closer to the workpiece when the coils have a greater overall width.

One advantage of these flexible arrangements is that the same coil pair may uniformly heat workpieces of different cross sectional widths. Flexible connections between coils sections may be provided by making the entire coil of a flexible material, by using suitable electrically conductive hinges at the connections, or by using another suitable method of moving coil sections relative to each other. Non-limiting examples of electrically conductive hinges are one or more flexible cables or bus bars.

Figure 3E:
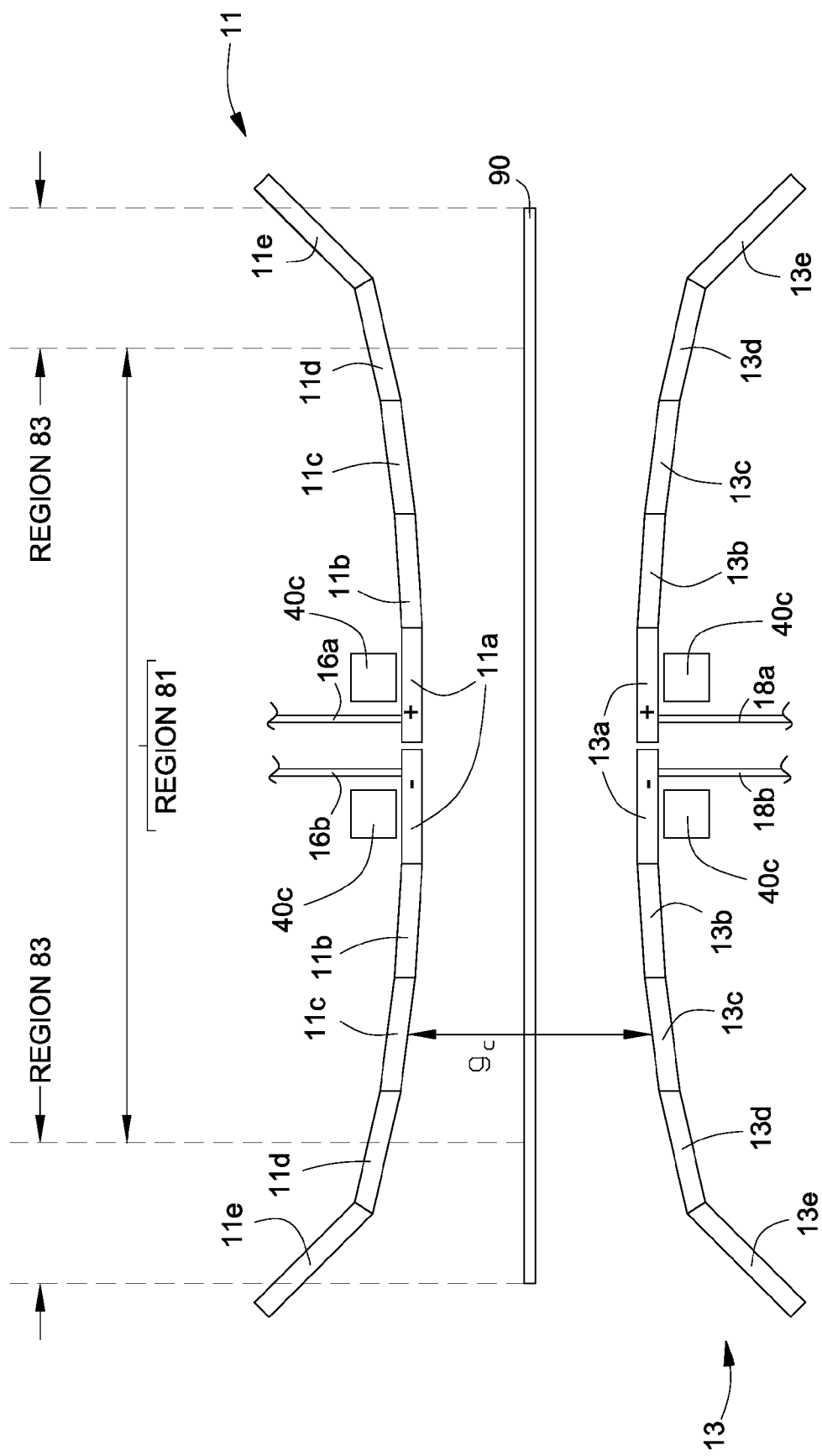
FIG. 3(e) is an elevation view of another example of the transverse flux inductor of the present invention.

FIG. 3(e) illustrates another example of a transverse flux inductor of the present invention. In this non-limiting example, the transverse flux inductor comprises a pair of coils formed from first coil 11 and second coil 13 oriented across the cross section of workpiece 90, which is placed between the pair of coils. Each of the two coils comprise a plurality of coil sections, namely central coil sections 11a and 13a; first transition coil sections 11b and 13b; shoulder coil sections 11c and 13c; second transition coil sections 11d and 13d; and edge sections 11e and 13e. As shown in FIG. 3(e) the gap, $g_c$, between opposing sections of the two coils increases in the directions from the central section of the coils to the opposing edges of the coils. Flux concentrators 40c are optionally used to concentrate flux around the cross sectional center of the workpiece. This arrangement is of particular advantage in configurations where shoulder region under heating is not significant and edge region overheating must be avoided. As for other examples of the invention, the coil sections may be fixed in position or flexibly attached to each other to permit readjustment of the gap dimension between opposing coil sections.

Figure 4:
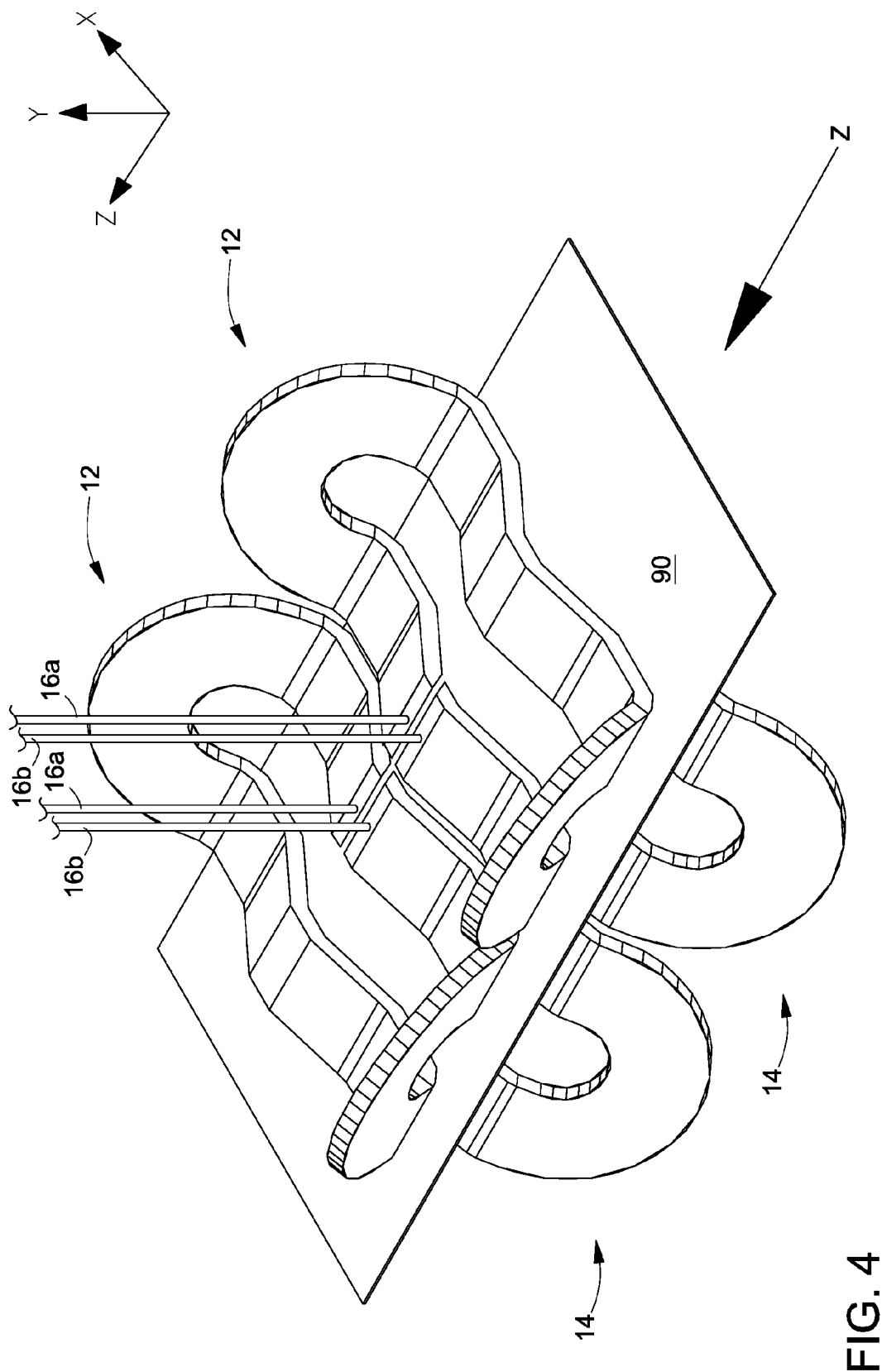
FIG. 4 illustrates another example of the transverse flux inductor of the present invention.

FIG. 4 illustrates another example of the transverse flux inductor of the present invention wherein two pairs of coils are used. Any number of coil pairs may be used in all examples of the invention without deviating from the scope of the invention. While the coils are diagrammatically illustrated here as single turn coils, in other examples of the invention, a coil may be of alternative arrangements, such as but not limited to, a multi-turn coil or coils, and may be configured either in series, parallel, or combinations thereof, to suit the dimensions of the workpiece that is heated, and/or to achieve optimum load matching with the utilized power supplies. Further a coil may be air or fluid cooled, and/or integrally formed from a single piece of suitable electrical conductor. Alternatively two or more of the sections may be separately formed and joined together.

Figure 5:
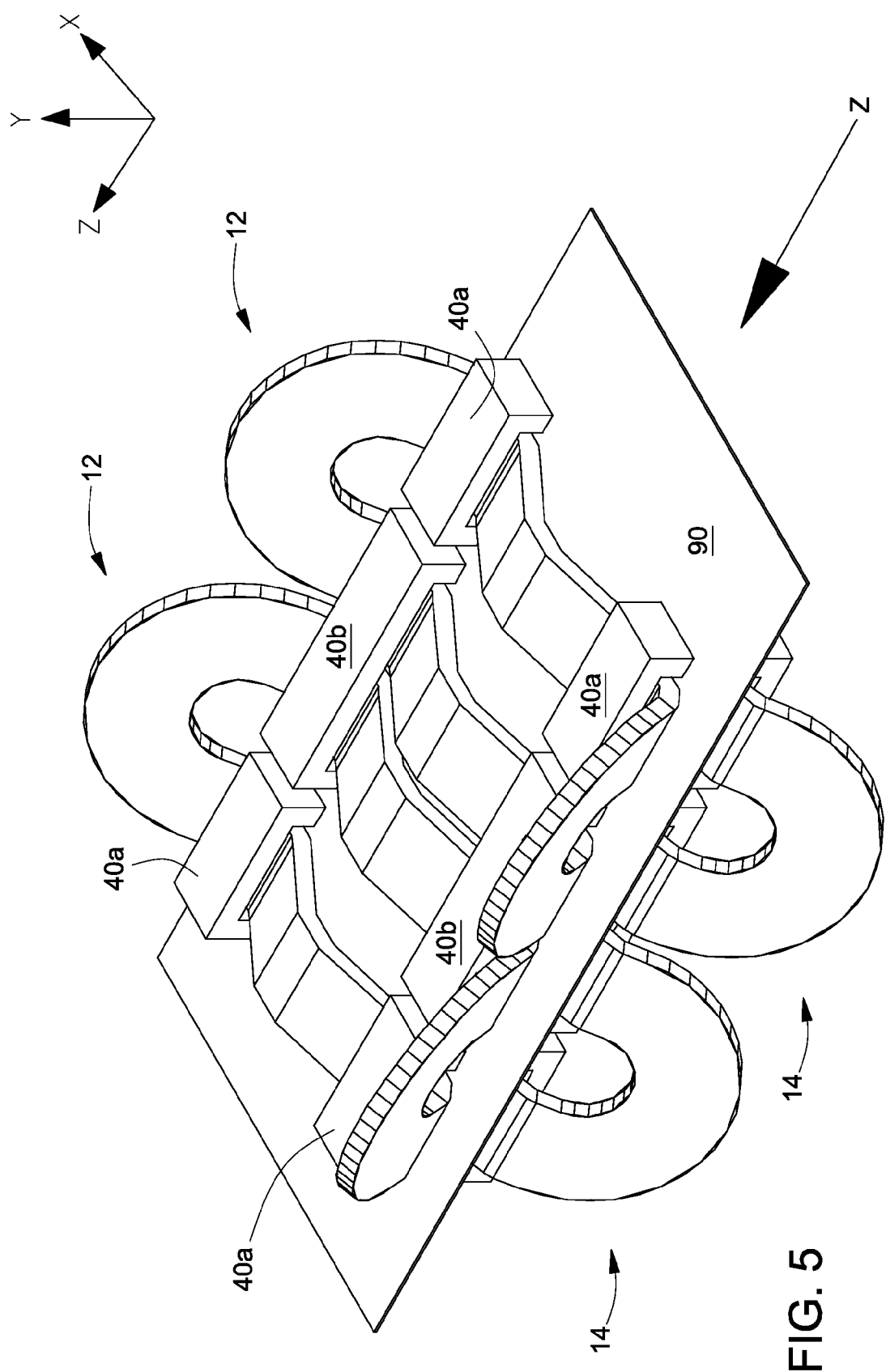
FIG. 5 illustrates another example of the transverse flux inductor of the present invention with selective use of flux concentrators.

FIG. 5 illustrates another example of the transverse flux inductor of the present invention wherein two pairs of coils and a non-limiting arrangement of flux concentrators 40a and 40b, formed from materials known in the art, are used around the shoulder sections of the coils in all directions, except the direction facing the workpiece, to concentrate magnetic flux from the shoulder sections to further heat the regions of the workpiece between the shoulder sections of the coils. In other examples of the invention, the flux concentrators may be positioned around any other coil sections to provide a desired cross sectional induced heating profile. Further a flux concentrator may be positioned partially around any coil section, or may comprise segmented components around any coil section. In some examples of the invention the flux concentrators may be suitably connected to operators that permit movement of the flux concentrators in the Y-direction to alter the induced cross section heating of the workpiece.

Figure 6:
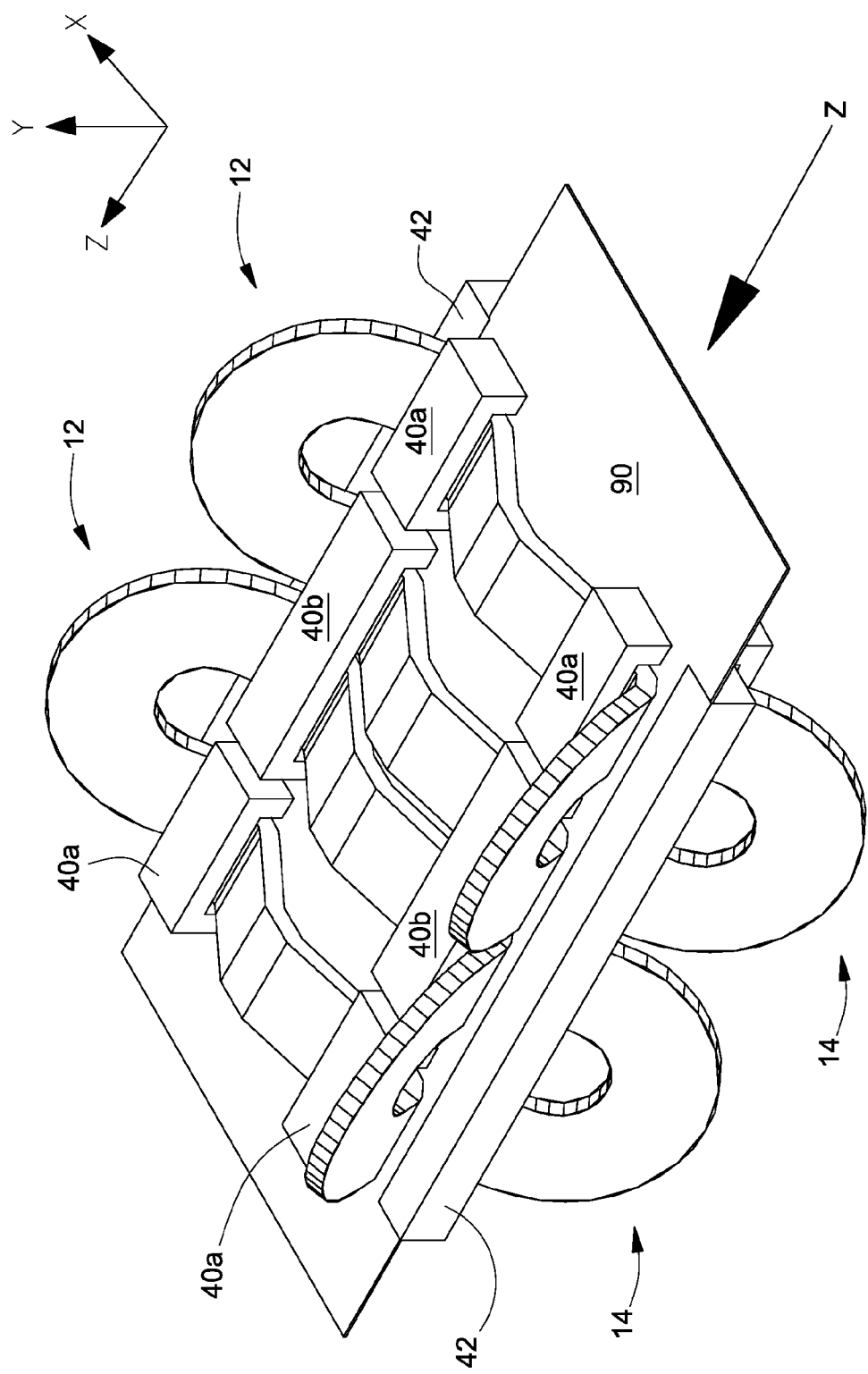
FIG. 6 illustrates another example of the transverse flux inductor of the present invention with selective use of electromagnetic shields, either alone or in combination with selective use of flux concentrators.

FIG. 6 illustrates another example of the transverse flux inductor of the present invention wherein edge electromagnetic shields 42 are used in combination with the two pairs of coils and flux concentrators shown in FIG. 5. Shields 42, which are formed from electrically conductive materials such as copper, can be used to reduce induced edge heating in a particular application. In some examples of the invention, the edge electromagnetic shields may be suitably connected to operators that permit movement of the shields to alter the edge shielding patterns.

In other examples of the invention, flux concentrators and electromagnetic shields may be used in the alternative, or in combination, to control magnetic flux from one or more sections of the coils, and therefore, the magnitude of induced heating of the workpiece between opposing coil sections implementing the concentrators and/or shields. Concentrators and/or shields may be connected to suitable mechanical operators that allow the concentrators to be vertically moved (that is, in the Y-direction), and the concentrators and/or shields to be horizontally moved (that is, in the X-direction), depending upon the particular heat pattern requirements of the workpiece currently between the one or more pairs of coils.

Figure 7:
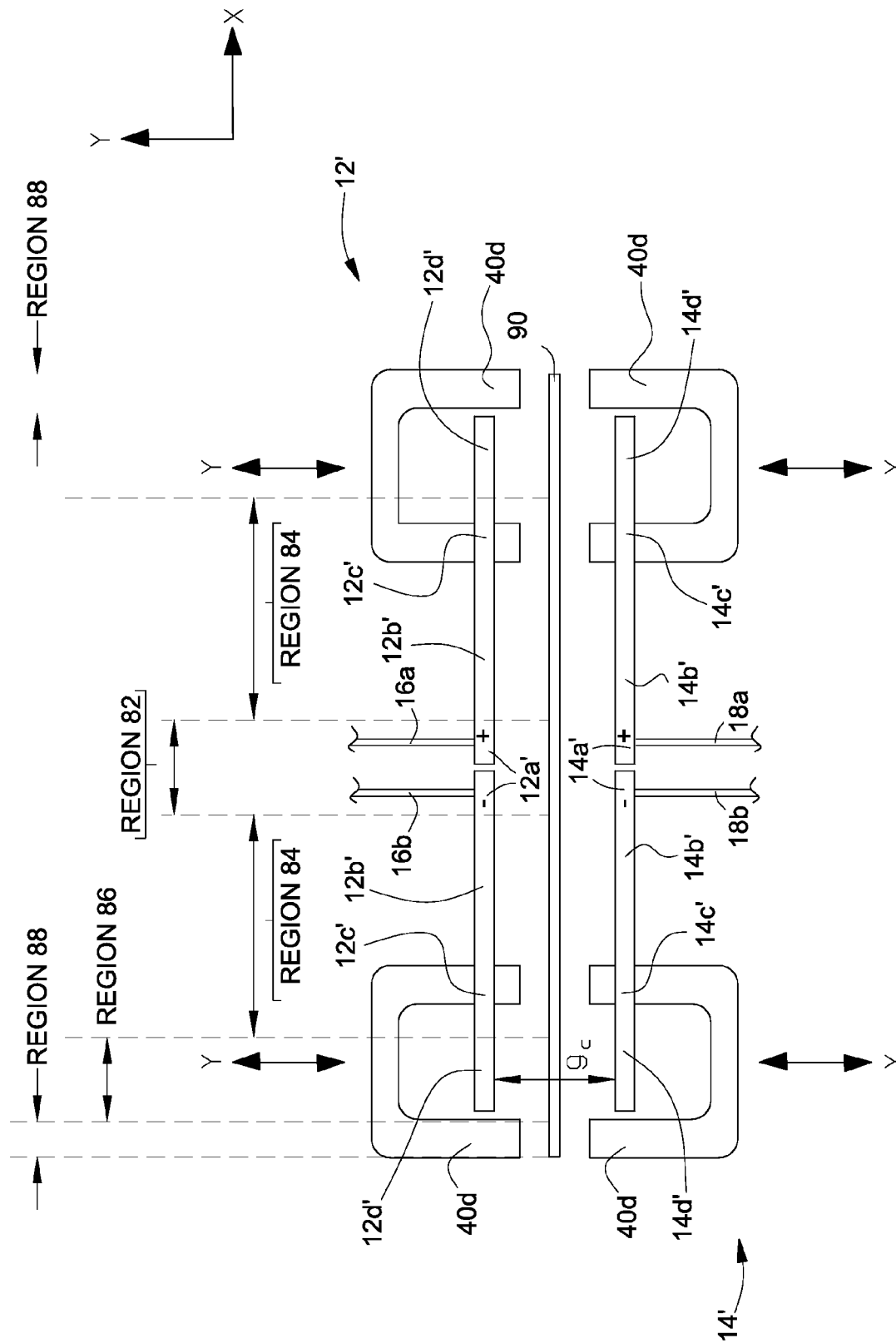
FIG. 7, FIG. 8(a) and FIG. 8(b) illustrate other examples of the transverse flux inductor of the present invention with flux concentrators.

Utilization of concentrators and/or shields allow all sections of each coil to be aligned substantially parallel to, and equidistant from, all sections of the opposing coil. For example, in FIG. 7 all opposing sections of coils 12' and 14' are aligned substantially parallel to, and equidistant from, each other. In this arrangement, coil sections 12a', 12b' and 12c' may be referred to as a combined central coil section 12a", as shown, for example, in FIG. 8(a) and FIG. 8(b); similarly coil sections 14a' 14b' and 14c' may be referred to as a combined central coil section 14a". In FIG. 7, "U" shaped flux concentrators 40d are generally located over edge coil sections 12d' and 14d'. The "U" shaped edge concentrators 40d may be vertically moved (that is, in the Y-direction), individually or as a group, as required to achieve desired heating in edge regions 88 and adjacent shoulder regions 86.

Figure 8A:
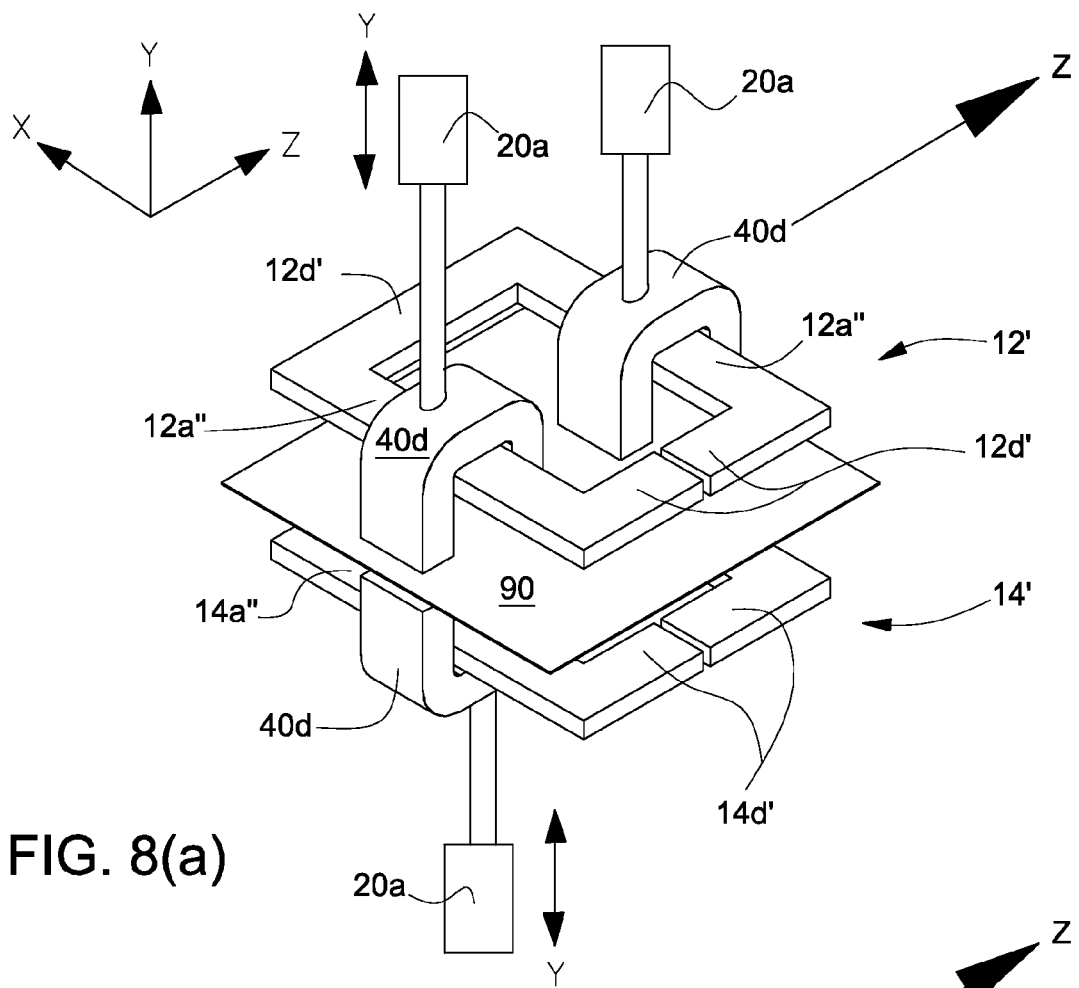
Figure 8B:
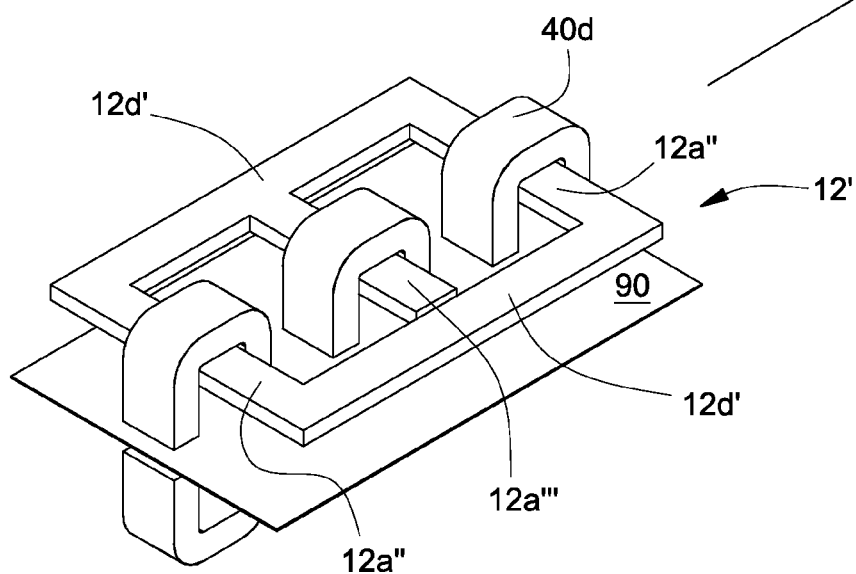

FIG. 8(a) illustrates an example of the invention where flux concentrators 40d are place over one or more of combined central coil sections 12a" and 14a" with all opposing coil sections of coils 12' and 14' aligned substantially parallel to, and equidistant from, each other. In this arrangement, movement of the one or more flux concentrators 40d in the Y-direction changes the concentration of magnetic flux in the central region of the workpiece, and therefore, the magnitude of induced heating in the central cross section region of the workpiece. This arrangement is particularly useful when heat control of the edge and adjacent regions is not of major concern. In FIG. 8(b) the arrangement in FIG. 8(a) is modified to include third combined central coil sections 12a'" and 14a'" (not visible in the figure) to provide increased degree of heat control for the central region.

Figure 9:
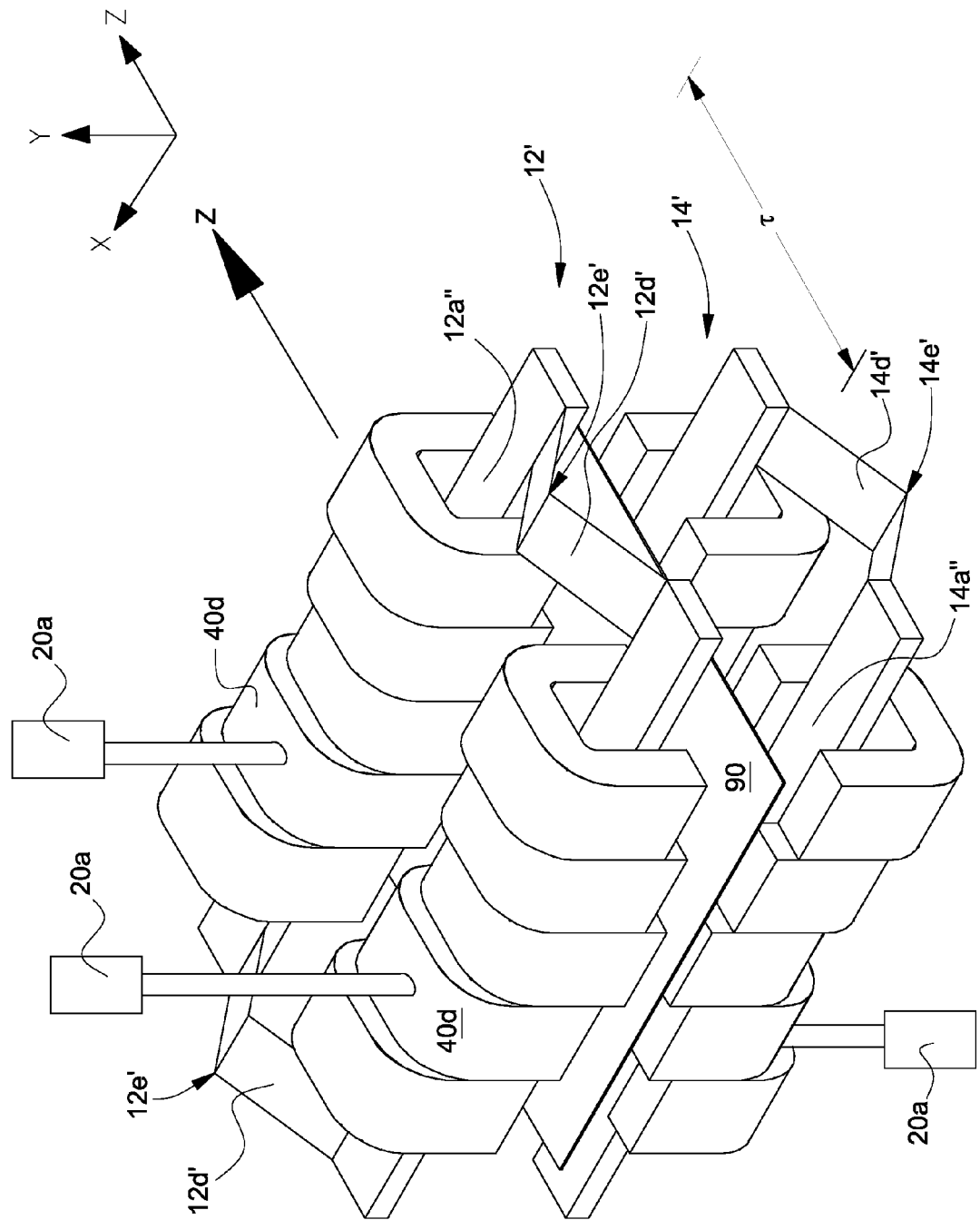
FIG. 9 illustrates another example of the transverse flux inductor of the present invention with flux concentrators and coils with adjustable pole pitch.

In the example of the invention shown in FIG. 9, a plurality of flux concentrators 40d are located across the combined central coil sections 12a" and 14a" with all opposing coil sections of coils 12' and 14' aligned substantially parallel to, and equidistant from, each other. In this arrangement, movement of the one or more flux concentrators 40d in the Y-direction selectively changes the concentration of magnetic flux along the cross section of the workpiece, and therefore, selectively controls the magnitude of induced heating across the cross section of the workpiece. Optionally with this arrangement, edge sections 12d' and 14d' may include an electrical hinge element 12e' and 14e', respectively, that allow movement of the combined central sections 12a" and 14a" in the Z-direction to change the pole pitch, τ, of the coils.

While "U" shaped flux concentrators are used above, in other examples of the invention, the flux concentrators may be of other shapes to suit a particular application.

In other examples of the invention, the coils on each side of the workpiece may be contained in separate box structures so that the workpiece is positioned between the two boxes. The boxes may comprise electrically conductive material, connected to electrical ground, on all sides except the sides facing the workpiece. The sides of the boxes facing the workpiece can be a magnetically transparent material, such as mica.

The above examples of the invention have been provided merely for the purpose of explanation and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification and the appended claims, may effect numerous modifications thereto, and changes may be made without departing from the scope of the invention in its aspects.

The invention claimed is:

1. An inductor for electric induction heating of an electrically conductive workpiece, the inductor comprising:

at least one pair of opposing coils formed from a first and second coil, the electrically conductive workpiece placed between the pair of coils, the pair of coils oriented across the cross section of the workpiece, each of the first and second coils comprising a plurality of coil sections traversing an opposing surface of the workpiece, the plurality of coil sections comprising at least two central sections traversing the workpiece, each of the at least two central sections joined together at adjacent ends by an edge section, the opposing plurality of coil sections of the first and second coils equidistant from each other;

at least one flux concentrator at least partially surrounding at least one of the coil sections, the at least one flux concentrator comprising a "U" shaped concentrator located around at least one of the edge sections;

an operator for moving the at least one flux concentrator in a direction perpendicular to the surface of the workpiece; and at least one ac power supply suitably connected to the first and second coils of the inductor to supply ac power to the inductor to inductively heat the workpiece to a cross sectional temperature profile.

* * * * *